United States Patent
Civlin

(10) Patent No.: US 11,693,664 B2
(45) Date of Patent: Jul. 4, 2023

(54) METHODS AND SYSTEMS FOR DISTRIBUTING INSTRUCTIONS AMONGST MULTIPLE PROCESSING UNITS IN A MULTISTAGE PROCESSING PIPELINE

(71) Applicant: Pensando Systems Inc., Milpitas, CA (US)

(72) Inventor: Jan Civlin, Sunnyvale, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 17/367,286

(22) Filed: Jul. 2, 2021

(65) Prior Publication Data

US 2023/0004395 A1    Jan. 5, 2023

(51) Int. Cl.
G06F 8/41 (2018.01)
G06F 9/38 (2018.01)

(52) U.S. Cl.
CPC ............ *G06F 9/3836* (2013.01); *G06F 8/433* (2013.01); *G06F 8/451* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 6,591,343 B1 * | 7/2003 | Col | G06F 12/0846 712/213 |
| 7,181,742 B2 * | 2/2007 | Hooper | G06F 9/3851 719/310 |
| 8,059,650 B2 * | 11/2011 | Shetty | H04L 49/3009 370/392 |
| 9,753,876 B1 * | 9/2017 | Hanscom | G06F 11/1004 |
| 10,261,766 B2 * | 4/2019 | Chandler | G06F 8/4452 |
| 2016/0306772 A1 * | 10/2016 | Burger | G06F 9/5077 |
| 2020/0097269 A1 * | 3/2020 | Wang | G06F 9/45516 |
| 2020/0336425 A1 * | 10/2020 | Galles | H04L 45/74591 |
| 2021/0294638 A1 * | 9/2021 | Edwards | G06F 9/485 |

OTHER PUBLICATIONS

Chole, Sharad et al. "dRMT: Disaggregated Programmable Switching", SIGCOMM '17, Aug. 21-25, 2017, Los Angeles, CA, USA, (2017), 14 pgs.

(Continued)

*Primary Examiner* — Marina Lee
(74) *Attorney, Agent, or Firm* — Loza & Loza, LLP

(57) ABSTRACT

Methods and systems for distributing instructions amongst processing units in a processing pipeline are disclosed. A method includes compiling a set of instructions for a stage of a multistage programmable processing pipeline in which the stage of the multistage programmable processing pipeline includes multiple processing units configured to processes instructions in parallel, wherein compiling the set of instructions includes, identifying first and second subsets of instructions within the set of instructions that can be executed independent of each other, assigning the first subset of instructions to a first processing unit of the stage, assigning the second subset of instructions to a second processing unit of the stage, and executing the first and second subsets of instructions in parallel at the first and second processing units, respectively.

17 Claims, 11 Drawing Sheets

(56) References Cited

OTHER PUBLICATIONS

Hypolite, Joel et al. "DeepMatch: Practical Deep Packet Inspection in the Data Plane using Network Processors", CoNEXT '20, Dec. 1-4, 2020, Barcelona, Spain, (2020), 15 pgs.
Kerns, Daniel et al. "Balanced Scheduling: Instruction Scheduling When Memory Latency is Uncertain", (1993), pp. 278-289.
Lo, Jack L. et al. "Improving Balanced Scheduling with Compiler Optimizations that Increase Instruction-Level Parallelism", SIGPLAN '95 La Jolla, CA USA, (1995), pp. 151-162.

* cited by examiner

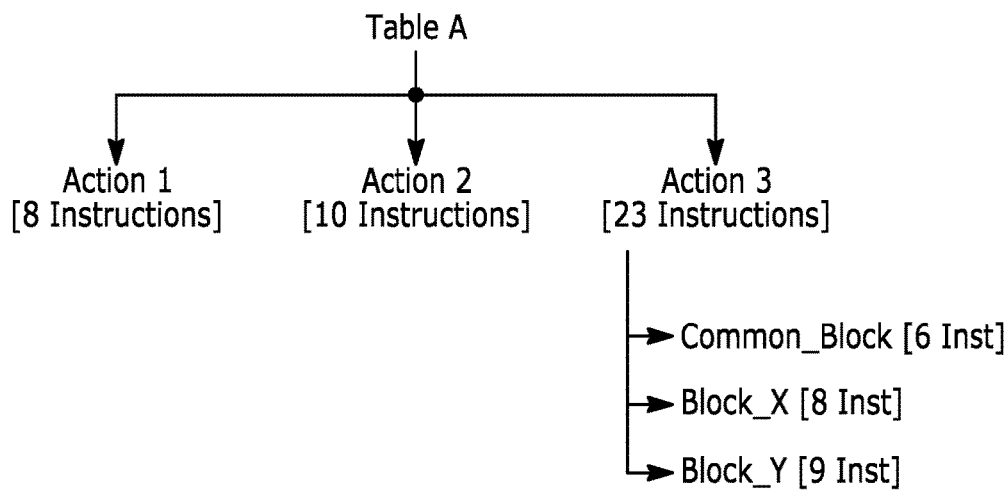
FIG. 9
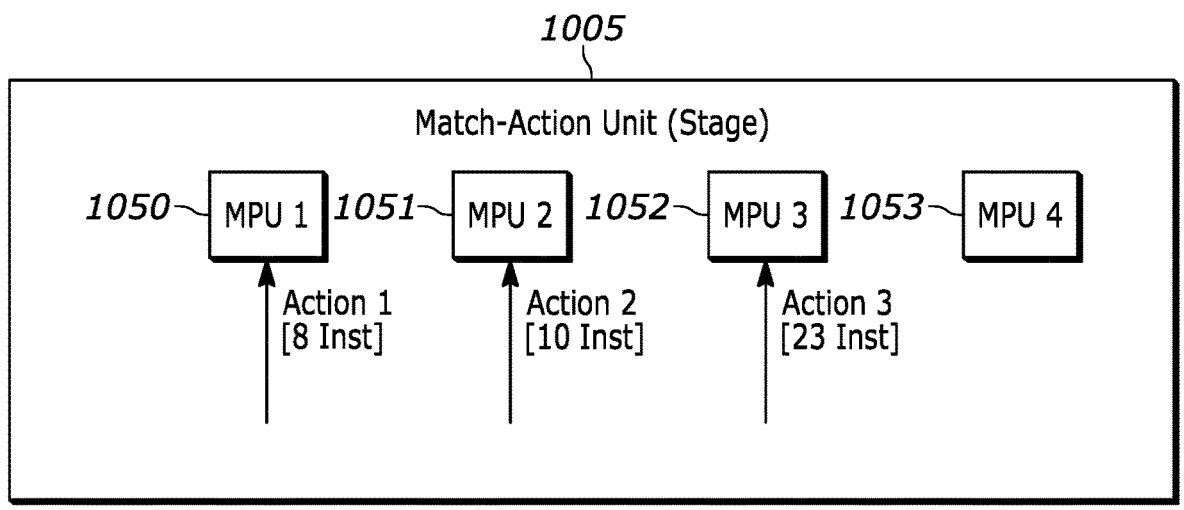
FIG. 10
Action 3
First Subset { Common_Block [6 Inst]
Block_X [8 Inst]
Second Subset { Common_Block [6 Inst]
Block_Y [9 Inst]
FIG. 11

METHODS AND SYSTEMS FOR DISTRIBUTING INSTRUCTIONS AMONGST MULTIPLE PROCESSING UNITS IN A MULTISTAGE PROCESSING PIPELINE

TECHNICAL FIELD

The embodiments relate to computer networks, network appliances, network interface cards (NICs), network switches, network routers, programmable processing pipelines, P4 packet processing pipelines, and programmable packet processing pipelines implemented using special purpose circuitry.

BACKGROUND

In data networks, network appliances such as switches, routers, and NICs receive packets at input interfaces, process the received packets, and then forward the packets to one or more output interfaces. It is important that such network appliances operate as quickly as possible in order to keep pace with a high rate of incoming packets. One challenge associated with network appliances relates to processing instructions in a multistage pipeline in which processing cannot proceed to the next stage until all of the instructions are processed in the current stage.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method for operating a multistage programmable processing pipeline. The method includes compiling a set of instructions for a stage of a multistage programmable processing pipeline in which the stage of the multistage programmable processing pipeline includes multiple processing units configured to processes instructions in parallel, wherein compiling the set of instructions includes, identifying first and second subsets of instructions within the set of instructions that can be executed independent of each other, assigning the first subset of instructions to a first processing unit of the stage, assigning the second subset of instructions to a second processing unit of the stage, and executing the first and second subsets of instructions in parallel at the first and second processing units, respectively.

In an embodiment, the first subset of instructions is assigned to the first processing unit and the second subset of instructions is assigned to the second processing unit to reduce the length of the longest thread of instructions that must be processed in the stage.

In an embodiment, the first subset of instructions is assigned to the first processing unit and the second subset of instructions is assigned to the second processing unit to reduce idle time associated with processing the set of instructions in the stage.

In an embodiment, the first subset of instructions is assigned to the first processing unit and the second subset of instructions is assigned to the second processing unit to balance the number of instructions that are executed by the first and second processing units.

In an embodiment, the processing units are match processing units (MPUs).

In an embodiment, the set of instructions is provided to the stage as a table of actions.

In an embodiment, the processing units are match processing units (MPUs) and wherein the set of instructions is provided to the stage as a table of actions.

In an embodiment, identifying that the first and second subsets of instructions can be executed independent of each other involves implementing an auto parallelization engine.

In an embodiment, at least one of the first and second processing units is an available processing unit.

Another method for operating a multistage programmable processing pipeline is disclosed. The method involves compiling at least one action for a stage of a multistage programmable processing pipeline in which the stage of the multistage programmable processing pipeline comprises a match-action unit with multiple match processing units (MPUs) configured to processes instructions in parallel, wherein compiling the set of instructions includes, identifying first and second subsets of instructions within the at least one action that can be executed independent of each other, assigning the first subset of instructions to a first MPU of the match-action unit, assigning the second subset of instructions to a second MPU of the match-action unit, and executing the first and second subsets of instructions in parallel at the first and second MPUs, respectively.

In an embodiment, the first subset of instructions is assigned to the first MPU and the second subset of instructions is assigned to the second MPU to reduce the length of the longest thread of instructions that must be processed in the match-action unit during the stage.

A system is also disclosed. The system includes a multistage programmable processing pipeline in which stages of the multistage programmable processing pipeline include multiple processing units configured to process instructions in parallel, and a compiler configured to identify first and second subsets of instructions within a set of instructions that can be executed independent of each other, wherein the set of instructions is to be executed within a stage of the multistage programmable processing pipeline, assign the first subset of instructions to a first processing unit of the stage, and assign the second subset of instructions to a second processing unit of the stage.

In an embodiment, assigning the first subset of instructions to the first processing unit and assigning the second subset of instructions to the second processing unit involves balancing the number of instructions that are to be executed at the first and second processing units.

In an embodiment, the processing units are MPUs.

In an embodiment, the set of instructions is provided to the stage as a table of actions.

In an embodiment, the processing units are MPUs and wherein the set of instructions is provided to the stage as a table of actions.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 9 illustrates an example of actions, associated with a table, that are to be executed in a match-action unit of a multistage processing pipeline in which the stages include multiple MPUs that can execute instructions in parallel.

FIG. 10 illustrates an example of conventional processing of the instructions corresponding to Action 1, Action 2, and Action 3 by three MPUs in a match-action unit of a multistage processing pipeline.

FIG. 11 illustrates two subsets of the instructions of Action 3 that can be executed independent of each other.

DETAILED DESCRIPTION

Figure 1:
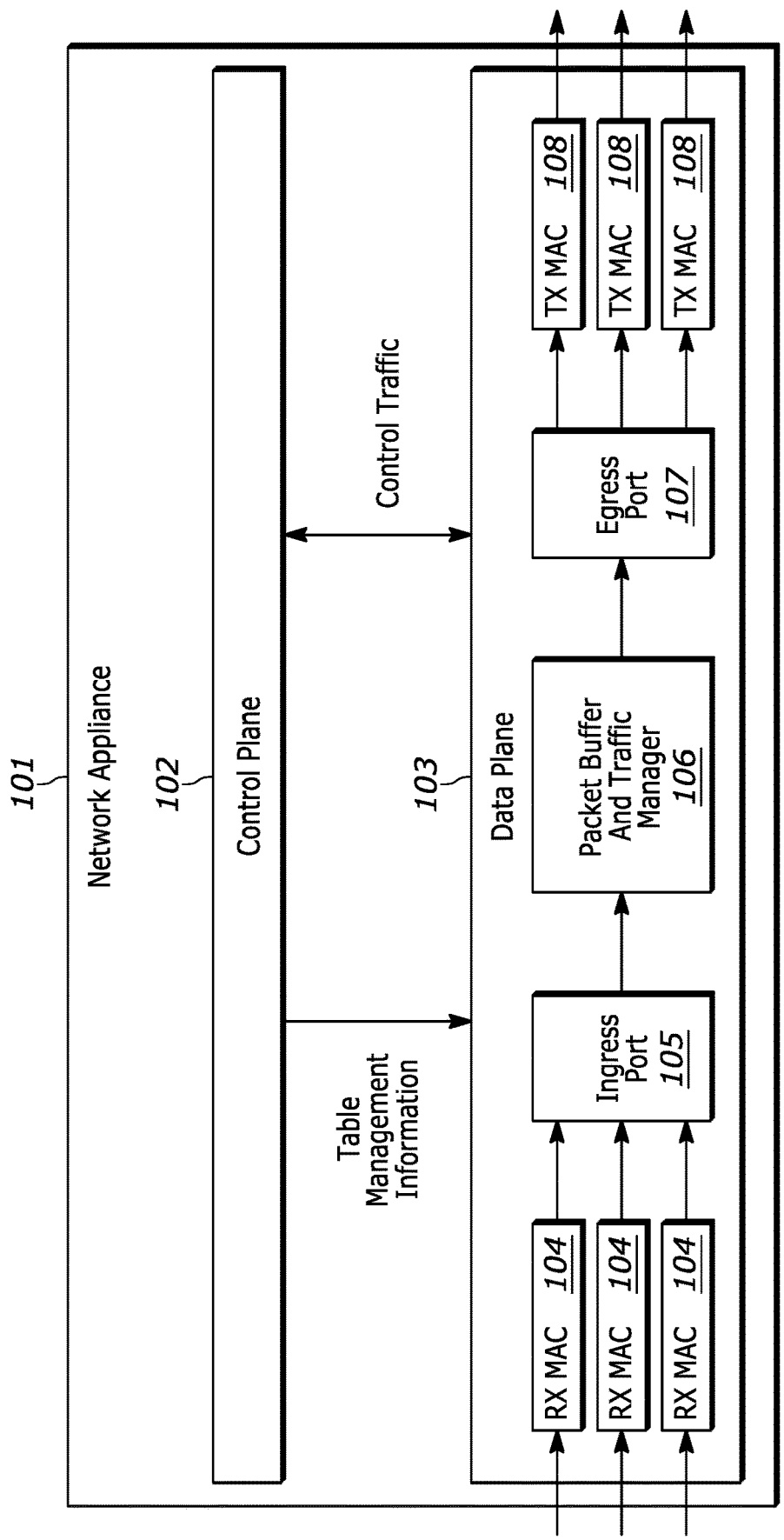
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In the field of data networking, the functionality of network appliances such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Two important aspects of a network appliance's performance are throughput and connection processing. Throughput, relating to packet processing speed, is often measured in bps (bits/sec) or Bps (bytes/sec). Connection processing, relating to the speed with which the network appliance can be configured to process new network traffic flows, is often measured in CPS (connections/sec). Throughput and CPS can be increased when processing is not subjected to delays corresponding to, for example, multi-thread processing.

Aspects described herein process packets using match-action pipelines, extended packet processing pipelines, and CPU (central processing unit) cores. The match-action pipeline is a part of a data plane that can process network traffic flows extremely quickly, but only after being configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is no flow table entry for the network traffic flow, it is a new network traffic flow that the match action pipeline is not yet configured to process.

FIG. 1 is a functional block diagram of a network appliance 101 having a control plane 102 and a data plane 103 and in which aspects may be implemented. As illustrated in FIG. 1, the control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBS) and Label Forwarding Information Bases (LFIBs), while the data plane is responsible for a high volume of time-sensitive forwarding decisions that need to be made at a rapid pace. In some embodiments, the control plane may implement operations related to packet routing that include Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Often times, the high-volume and rapid decision-making that occurs at the data plane is implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "$P4_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

Referring to FIG. 1, the data plane 103 includes multiple receive media access controllers (MACs) (RX MAC) 104, an ingress port 105, a packet buffer/traffic manager 106, an egress port 107, and multiple transmit MACs (TX MAC) 108. The data plane elements described may be implemented, for example, as a P4 programmable switch architecture (PSA) or as a P4 programmable NIC, although architectures other than a PSA and a P4 programmable NIC are also possible.

The RX MAC 104 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 108 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding. The packet buffer/traffic manager 106 includes memory and/or logic to implement packet buffering and/or traffic management. In an embodiment, operations implemented via the packet buffer/traffic manager include, for example, packet buffering, packet scheduling, and/or traffic shaping.

The ingress port 105 and egress port 107 can be packet processing pipelines that operate at the data plane of a network appliance and can be programmable via a domain-specific language such as P4. In an embodiment, the ingress port 105 and egress port 107 can be programmed to implement various operations at the data plane such as, for example, routing, bridging, tunneling, forwarding, network access control lists (ACLs), Layer 4 (L4) firewalls, flow-based rate limiting, VLAN tag policies, group membership, isolation, multicast, group control, label push/pop operations, L4 load-balancing, L4 flow tables for analytics and flow specific processing, distributed denial of service (DDoS) attack detection, DDoS attack mitigation, and telemetry data gathering on any packet field or flow state.

Figure 2:
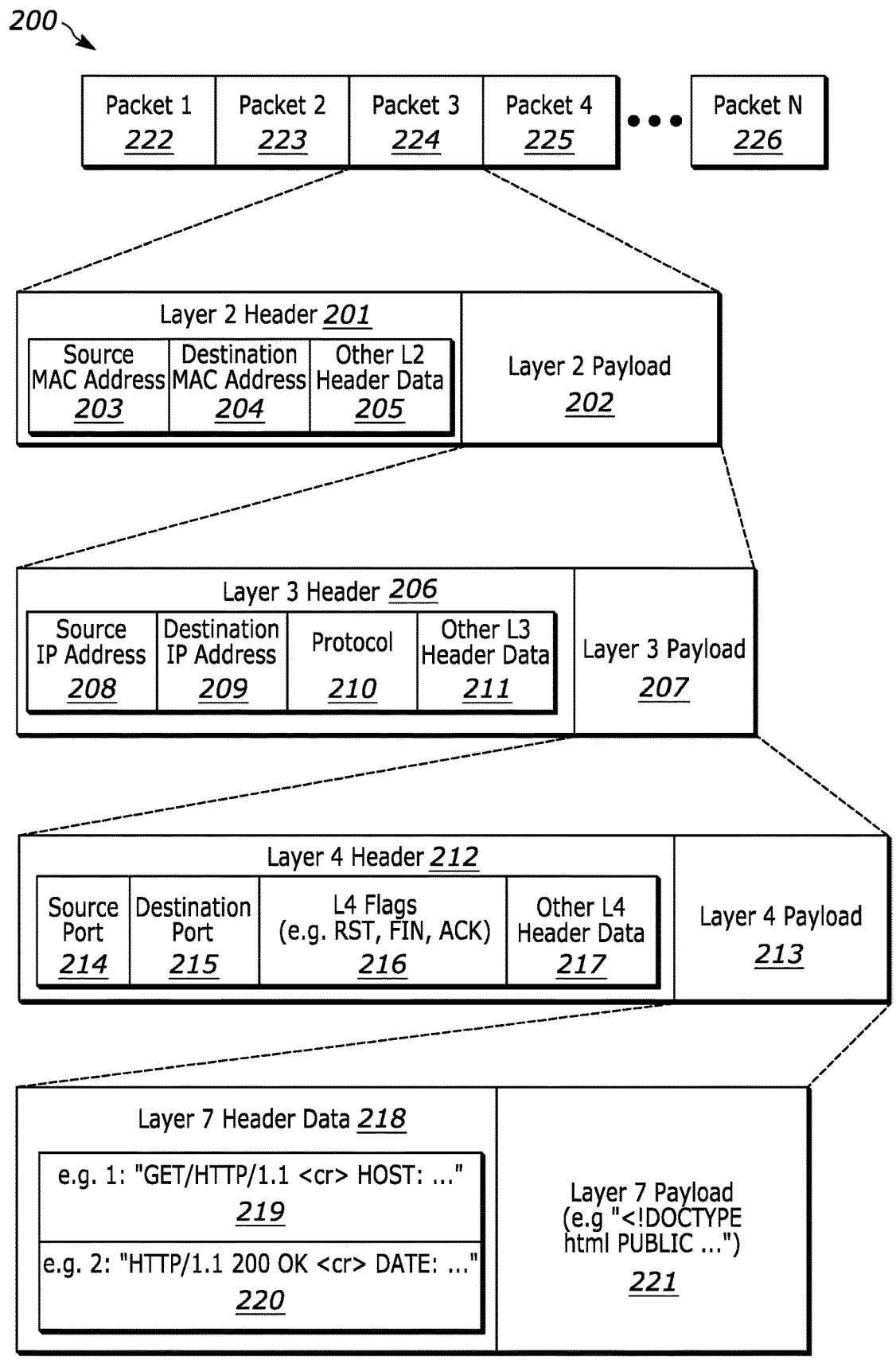
FIG. 2 illustrates packet headers and payloads of packets in a network traffic flow that can be processed according to some aspects.

FIG. 2 illustrates packet headers and payloads of packets 222, 223, 224, 225, 226 in a network traffic flow 200 that can be processed according to some aspects. A network traffic flow 200 can have numerous packets such as a first packet 222, a second packet 223, a third packet 224, a fourth packet 225, and a final packet 226 with many more packets between the fourth packet 225 and the final packet 226. The term "the packet" or "a packet" can refer to any of the packets in a network traffic flow.

In general, packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 104 as a raw bit stream or transmitted by TX MAC 108 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 201 and layer 2 payload 202. The layer 2 header can contain a source MAC address 203, a destination MAC address 204, and other layer 2 header data 205. The input ports 104 and output ports 108 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 104 and a TX MAC 108. Ethernet, also known as Institute of Electrical and Electronics Engineers (IEEE) 802.3 is a layer 2 protocol. IEEE 802.11 (WiFi) is another widely used layer 2 protocol. The layer 2 payload 202 can include a Layer 3 packet.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 206 and a layer 3 payload 207. The layer 3 header 206 can have a source IP address 208, a destination IP address 209, a protocol indicator 210, and other layer 3 header data 211. As an example, a first node can send an IP packet to a second node via an intermediate node. The IP packet therefor has a source IP address indicating the first node and a destination IP address indicating the second node. The first node makes a routing decision that the IP packet should be sent to the intermediate node. The first node therefor sends the IP packet to the intermediate node in a first layer 2 packet. The first layer 2 packet has a source MAC address 203 indicating the first node, a destination MAC address 204 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 203 indicating the intermediate node, a destination MAC address 204 indicating the second node, and the IP packet as a payload. The layer 3 payload 207 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 206 using protocol indicator 210. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 207 includes a TCP header and a TCP payload. UDP can provide for computer applications to send messages, in this case referred to as datagrams, to other hosts on an IP network using a connectionless model. When carrying UDP data, a layer 3 payload 207 includes a UDP header and a UDP payload. ICMP is used by network devices, including routers, to send error messages and operational information indicating success or failure when communicating with another IP address. ICMP uses a connectionless model.

A layer 4 packet can have a layer 4 header 212 and a layer 4 payload 213. The layer 4 header 212 can include a source port 214, destination port 215, layer 4 flags 216, and other layer 4 header data 217. The source port and the destination port can be integer values used by host computers to deliver packets to application programs configured to listen to and send on those ports. The layer 4 flags 216 can indicate a status of or action for a network traffic flow. For example, TCP has the RST, FIN, and ACK flags. RST indicates a TCP connection is to be immediately shutdown and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 213 can contain a layer 7 packet.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), and the Dynamic Host Configuration Protocol (DHCP). Data coded according to application layer protocols can be encapsulated into transport layer protocol units (such as TCP or UDP messages), which in turn use lower layer protocols to effect actual data transfer.

A layer 7 packet may have layer 7 header data 218 and may have a layer 7 payload 221. In practice, many applications do not distinguish between headers and payloads at layer 7. HTTP is a protocol that may be considered to have headers and payloads. The illustrated layer 7 headers are for an HTTP GET 219 and for a response to an HTTP GET 220. The illustrated payload is that of the response to the HTTP GET.

Figure 3:
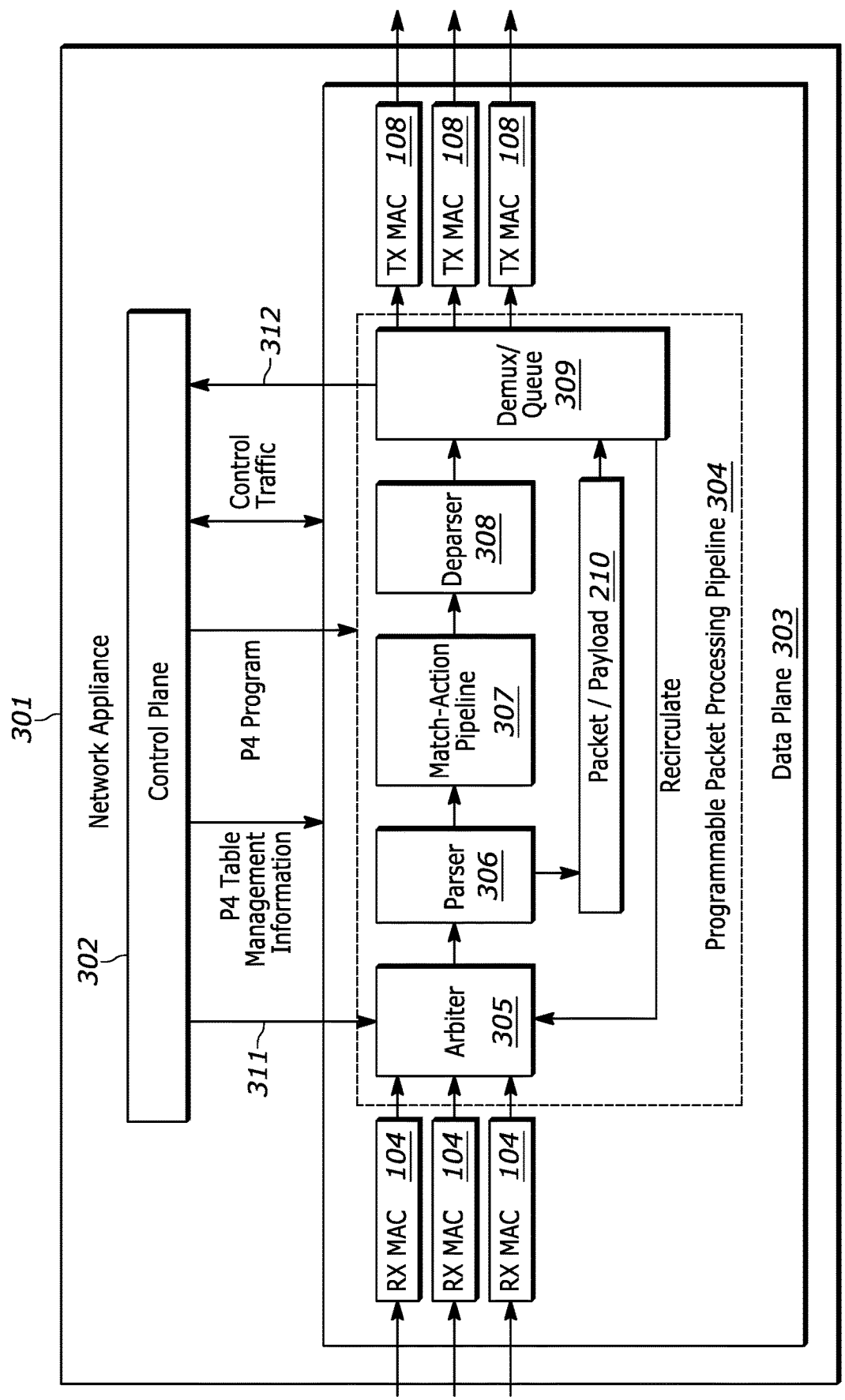
FIG. 3 is a depiction of a network appliance in which the data plane is programmable according to the P4 domain-specific language and in which aspects may be implemented.

FIG. 3 is a depiction of a network appliance 301 in which the data plane 303 is programmable according to the P4 domain-specific language and in which aspects may be implemented. As illustrated in FIG. 3, a P4 program is provided to the data plane via the control plane 302. The P4 program includes software code that configures the functionality of the data plane to implement particular processing and/or forwarding logic and processing and/or forwarding tables are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 303 includes a programmable packet processing pipeline 304 that is programmable using a domain-specific language such as P4 and that can be used to implement the programmable packet processing pipeline 304. As described in the P4 specification, a programmable packet processing pipeline can include an arbiter 305, a parser 306, a match-action pipeline 307, a deparser 308, and a demux/queue 309. The arbiter 305 can act as an ingress unit receiving packets from RX-MACs 104 and can also receive packets from the control plane via a control plane packet input 311. The arbiter 305 can also receive packets that are recirculated to it by the demux/queue 309. The demux/queue 309 can act as an egress unit and can also be configured to send packets to a drop port (the packets thereby disappear), to the arbiter via recirculation, and to the control plane 302 via an output CPU port. The control plane is often referred to as a CPU (central processing unit) although, in practice, control planes often include multiple CPU cores and other elements. The arbiter 305 and the demux/queue 309 can be configured through the domain-specific language (e.g., P4).

The parser 306 is a programmable element that is configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 308 is a programmable element that is configured through the domain-specific language (e.g., P4) to generate packet headers from PHVs at the output of match-action pipeline 307 and to construct outgoing packets by reassembling the header(s) (e.g., Ethernet and IP headers) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager (e.g. FIG. 1, element 106) for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 308) before the demux/queue 309 sends the packet to the TX MAC 108 or recirculates it back to the arbiter 305 for additional processing.

Figure 4:
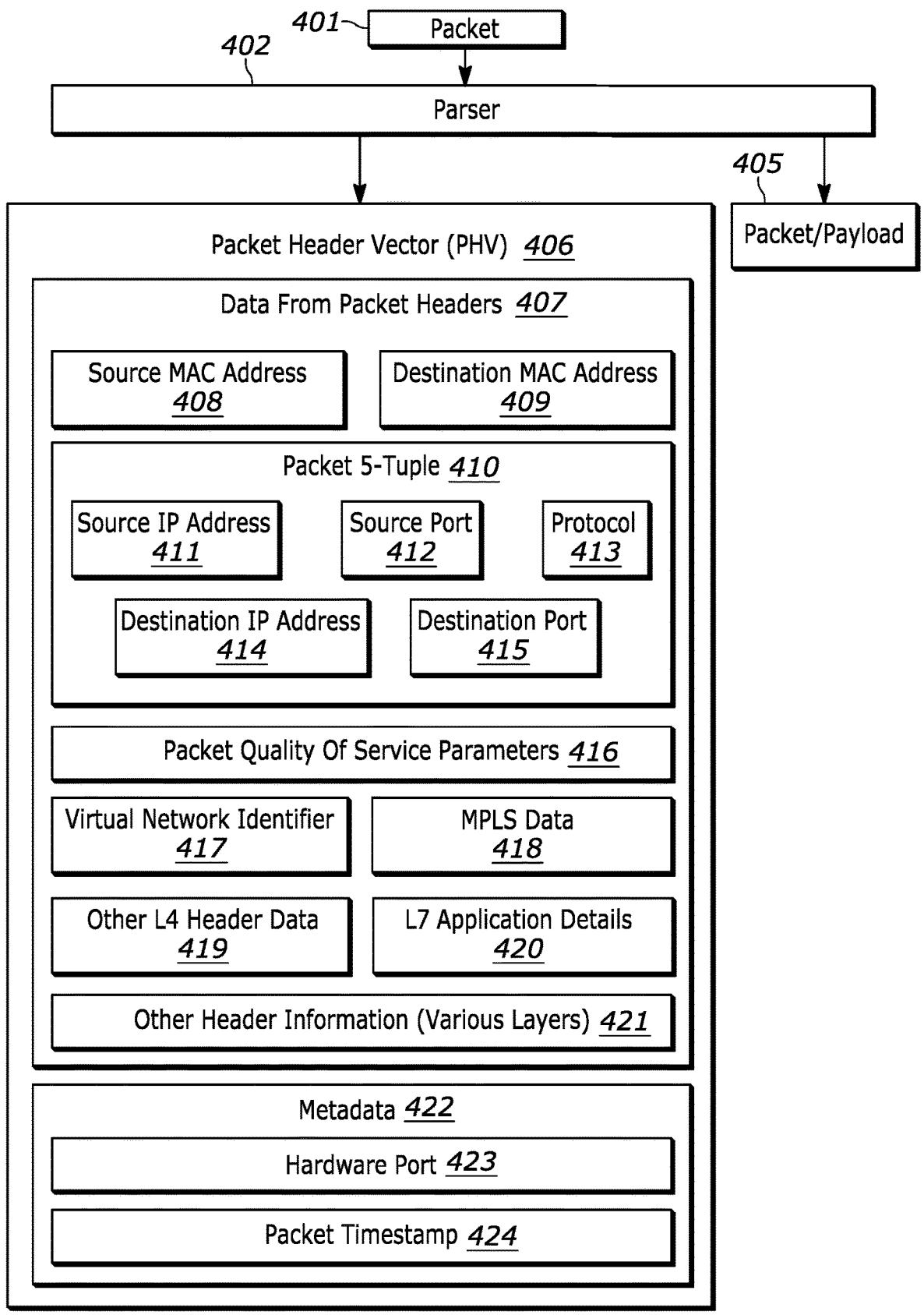
FIG. 4 is a high-level diagram illustrating an example of generating a packet header vector from a packet according to some aspects.

FIG. 4 is a high-level diagram illustrating an example of generating a packet header vector 406 from a packet 401 according to some aspects. The parser 402 can receive a packet 401 that has layer 2, layer 3, layer 4, and layer 7 headers and payloads. The parser can generate a packet header vector (PHV) from packet 401. The packet header vector can include many data fields including data from packet headers 407 and metadata 422. The metadata 422 can include data generated by the network appliance such as the hardware port 423 on which the packet 401 was received and the packet timestamp 424 indicating when the packet 401 was received by the network appliance.

The source MAC address 408 can be obtained from the layer 2 header 201. The destination MAC address 409 can be obtained from the layer 2 header 201. The source IP address 411 can be obtained from the layer 3 header 206. The source port 412 can be obtained from the layer 4 header 212. The protocol 413 can be obtained from the layer 3 header 206. The destination IP address 414 can be obtained from the layer 3 header 206. The destination port 415 can be obtained from the layer 4 header 212. The packet quality of service parameters 416 can be obtained from the layer 3 header 206 or another header based on implementation specific details. The virtual network identifier 417 may be obtained from the layer 2 header 201. The multi-protocol label switching (MPLS) data 418, such as an MPLS label, may be obtained from the layer 2 header 201. The other layer 4 data 419 can be obtained from the layer 4 header 212. The layer 7 application details 420 can be obtained from the layer 7 header 218 and layer 7 payload 221. The other header information 421 is the other information contained in the layer 2, layer 3, layer 4, and layer 7 headers.

The packet 5-tuple 410 is often used for generating keys for match tables, discussed below. The packet 5-tuple 410 can include the source IP address 411, the source port 412, the protocol 413, the destination IP address 414, and the destination port 415.

Those practiced in computer networking protocols realize that the headers carry much more information than that described here, realize that substantially all of the headers are standardized by documents detailing header contents and fields, and know how to obtain those documents. The parser can also be configured to output a packet or payload 405. Recalling that the parser 402 is a programmable element that is configured through the domain-specific language (e.g., P4) to extract information from a packet, the specific contents of the packet or payload 405 are those contents specified via the domain specific language. For example, the contents of the packet or payload 405 can be the layer 3 payload.

Figure 5:
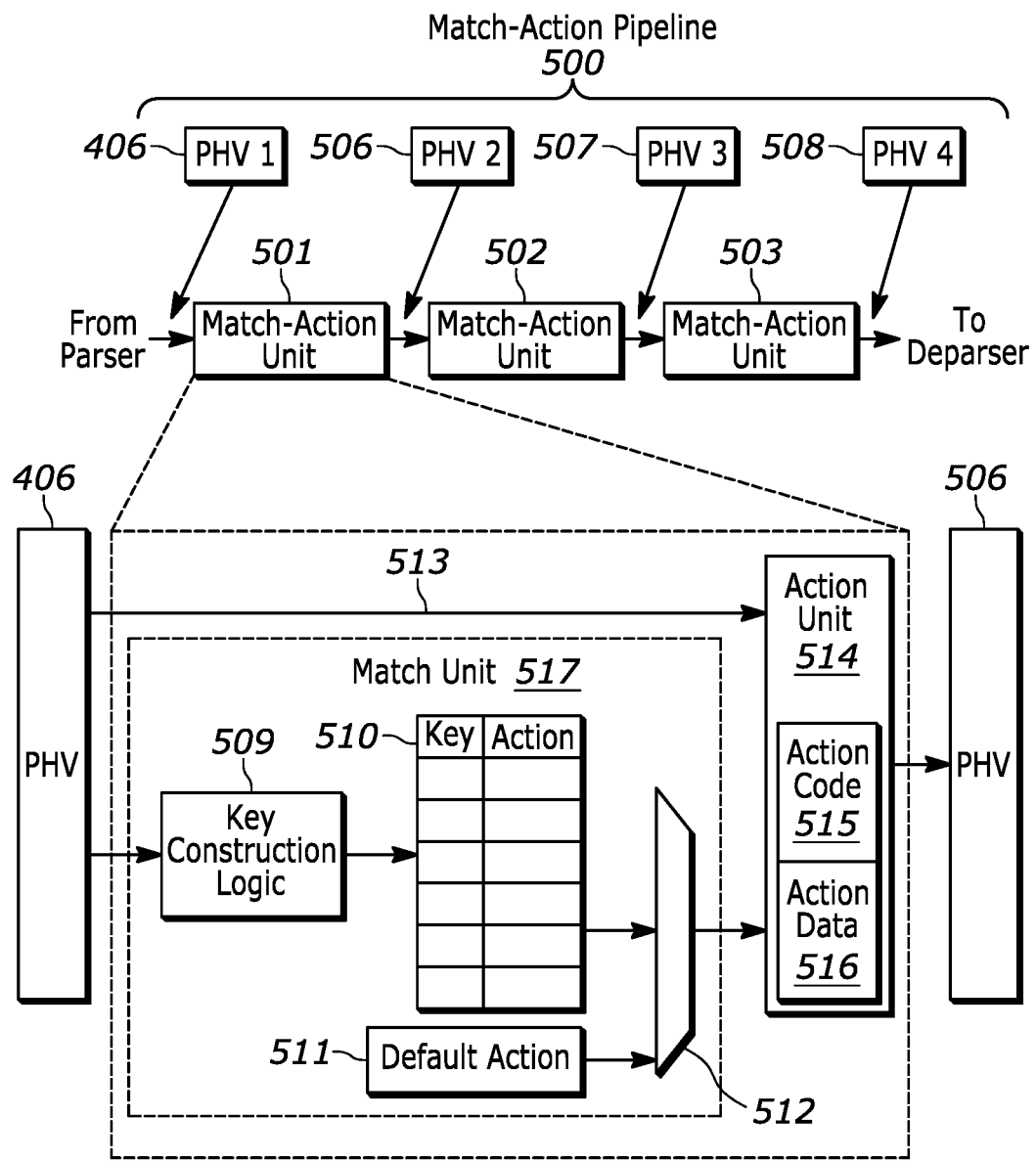
FIG. 5 is a functional block diagram illustrating an example of a match-action unit in a match-action pipeline according to some aspects.

FIG. 5 is a functional block diagram illustrating an example of a match-action unit 501 in a match-action pipeline 500 according to some aspects. FIG. 5 introduces certain concepts related to match-action units and match-action pipelines and is not intended to be limiting. The match-action units 501, 502, 503 of the match-action pipeline 500 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series also referred to as "stages" and each match-action unit implements a match-action operation or stage of the programmable processing pipeline. The PHV and/or table entries may be updated in each stage of match-action processing according to the actions specified by the P4 programming. In some instances, a packet may be recirculated through the match-action pipeline, or a portion thereof, for additional processing. Match-action unit 1 501 receives PHV 1 406 as an input and outputs PHV 2 506. Match-action unit 2 502 receives PHV 2 506 as an input and outputs PHV 3 507. Match-action unit 3 503 receives PHV 3 507 as an input and outputs PHV 4 508.

An expanded view of elements of a match-action unit 501 of match-action pipeline 500 is shown. The match-action unit includes a match unit 517 (also referred to as a "table engine") that operates on an input PHV 406 and an action unit 514 that produces an output PHV 506, which may be a modified version of the input PHV 406. The match unit 517 can include key construction logic 509, a lookup table 510, and selector logic 512. The key construction logic 509 is configured to generate a key from at least one field in the PHV. The lookup table 510 is populated with key-action pairs, where a key-action pair includes a key (e.g., a lookup key) and corresponding action code 515 and/or action data 516. In an embodiment, a P4 lookup table generalizes traditional switch tables, and can be programmed to implement, for example, routing tables, flow lookup tables, ACLs, and other user-defined table types, including complex multi-variable tables. The key generation and lookup function constitutes the "match" portion of the operation and produces an action that is provided to the action unit via the selector logic. The action unit executes an action over the input data (which may include data 513 from the PHV) and provides an output that forms at least a portion of the output PHV. For example, the action unit executes action code 515 on action data 516 and data 513 to produce an output that is included in the output PHV. If no match is found in the lookup table, then a default action 511 may be implemented. A flow miss is example of a default action that may be executed when no match is found. In an embodiment, operations of the match-action unit are programmable in the control plane via P4 and the contents of the lookup table is managed by the control plane.

Figure 6:
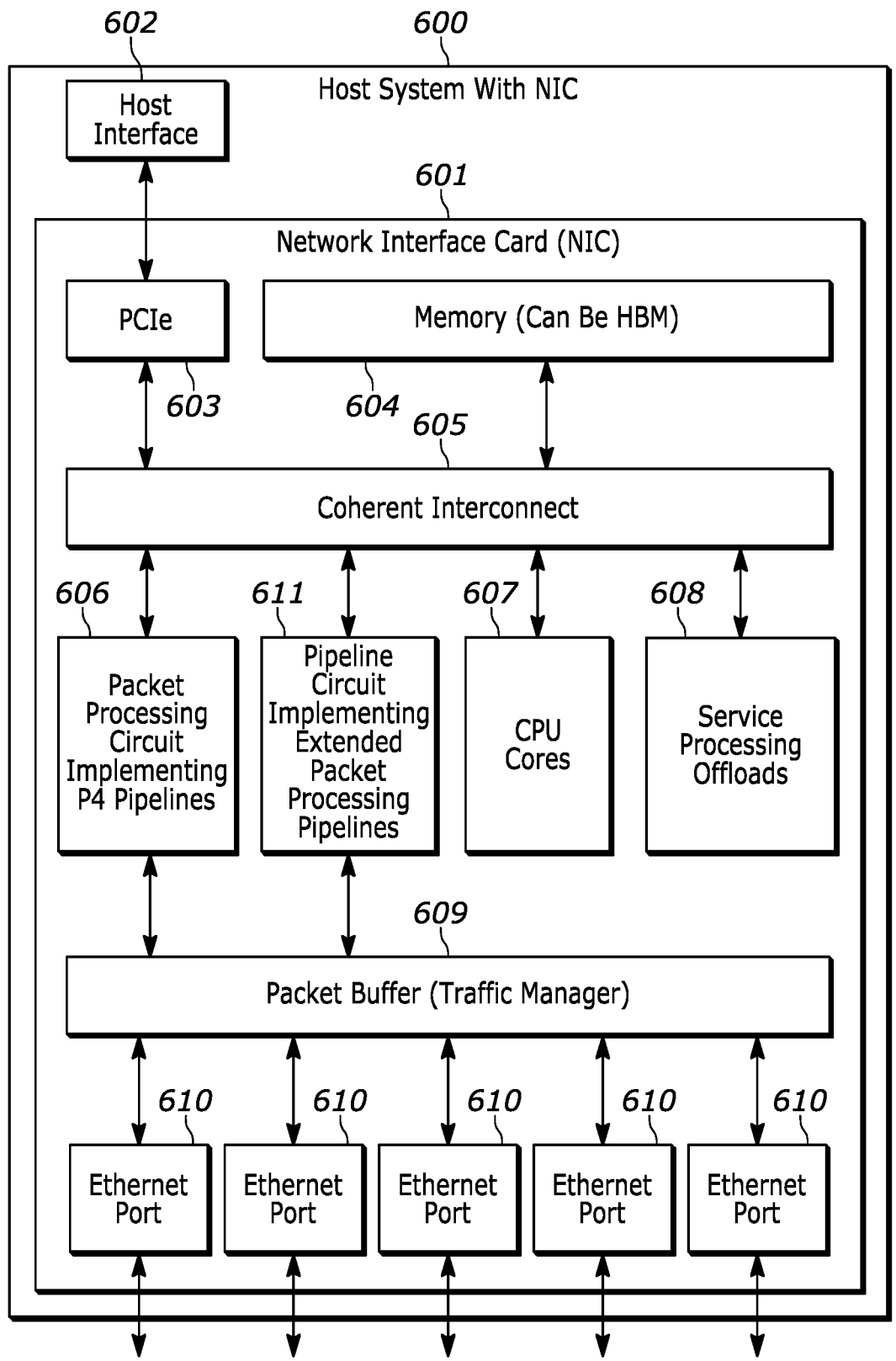
FIG. 6 is a high-level diagram of a network interface card configured as a network appliance according to some aspects.

FIG. 6 is a high-level diagram of a network interface card (NIC) 601 configured as a network appliance according to some aspects. Aspects of the embodiments, including packet processing pipelines, fast data paths, and slow data paths, can be implemented in the NIC 601. The NIC 601 can be configured for operation within a host system 600. The host system can be a general-purpose computer with a host interface 602 such as a PCIe interface. The NIC 601 can have a PCIe interface 603 through which it can communicate with the host system 600. The NIC can also include a memory 604, a coherent interconnect 605, a packet processing circuit implementing P4 pipelines 606, a pipeline circuit 611 implementing extended packet processing pipelines (also called P4+ pipelines), CPU cores 607, service processing offloads 608, packet buffer 609, and ethernet ports 610.

As discussed above, the P4 pipelines are configured for programming via a P4 domain-specific language for programming the data plane of network appliances that is currently defined in the "P4$_{16}$ Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification. The P4+ pipeline may be similar to a P4 pipeline bit is not constrained as the P4 pipeline is.

The NIC 601 can include a memory 604 for running Linux or some other operating system, for storing large data structures such as flow tables and other analytics, and for providing buffering resources for advanced features including TCP termination and proxy, deep packet inspection, storage offloads, and connected FPGA functions. The memory system may comprise a high bandwidth module (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

In an embodiment, the CPU cores 607 are general purpose processor cores, such as ARM processor cores, Microprocessor without Interlocked Pipeline Stages (MIPS) processor cores, and/or x86 processor cores, as is known in the field. In an embodiment, each CPU core includes a memory interface, an ALU, a register bank, an instruction fetch unit, and an instruction decoder, which are configured to execute instructions independent of the other CPU cores. In an embodiment, the CPU cores are Reduced Instruction Set Computers (RISC) CPU cores that are programmable using a general-purpose programming language such as C.

In an embodiment, each CPU core 607 also includes a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are four CPU cores 607 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 608 are specialized hardware modules purposely optimized to handle specific tasks at wire speed, such as cryptographic functions, compression/decompression, etc.

The packet buffer 609 can act as a central on-chip packet switch that delivers packets from the network interfaces 610 to packet processing elements of the data plane and vice-versa. The packet processing elements can include a slow data path implemented in software and a fast data path implemented by packet processing circuitry 606. The pipeline circuit 611 may operate as a part of the fast data path, may offload processing from the CPUs, and may perform other functions.

The packet processing circuit implementing P4 pipelines 606 can be a specialized circuit or part of a specialized circuit using one or more ASICs or FPGAs to implement a programmable packet processing pipeline such as the programmable packet processing pipeline 304 of FIG. 2. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 607 and memory 604 are configured via software to implement a slow data path. A network appliance having two data paths has a fast data path and a slow data path when one of the data paths process packets faster than the other data path.

The pipeline circuit 611 can be a specialized circuit or part of a specialized circuit using one or more ASICs or FPGAs to implement an extended packet processing pipeline. Some embodiments include ASICs or FPGAs implementing a P4+ pipeline supplementing P4 pipeline in a fast data path within the network appliance.

All memory transactions in the NIC 601, including host memory, on board memory, and registers may be connected via a coherent interconnect 605. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing P4 pipelines 606, pipeline circuit 611 implementing extended packet processing pipelines, CPU cores 607, and PCIe interface 603. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

Figure 7:
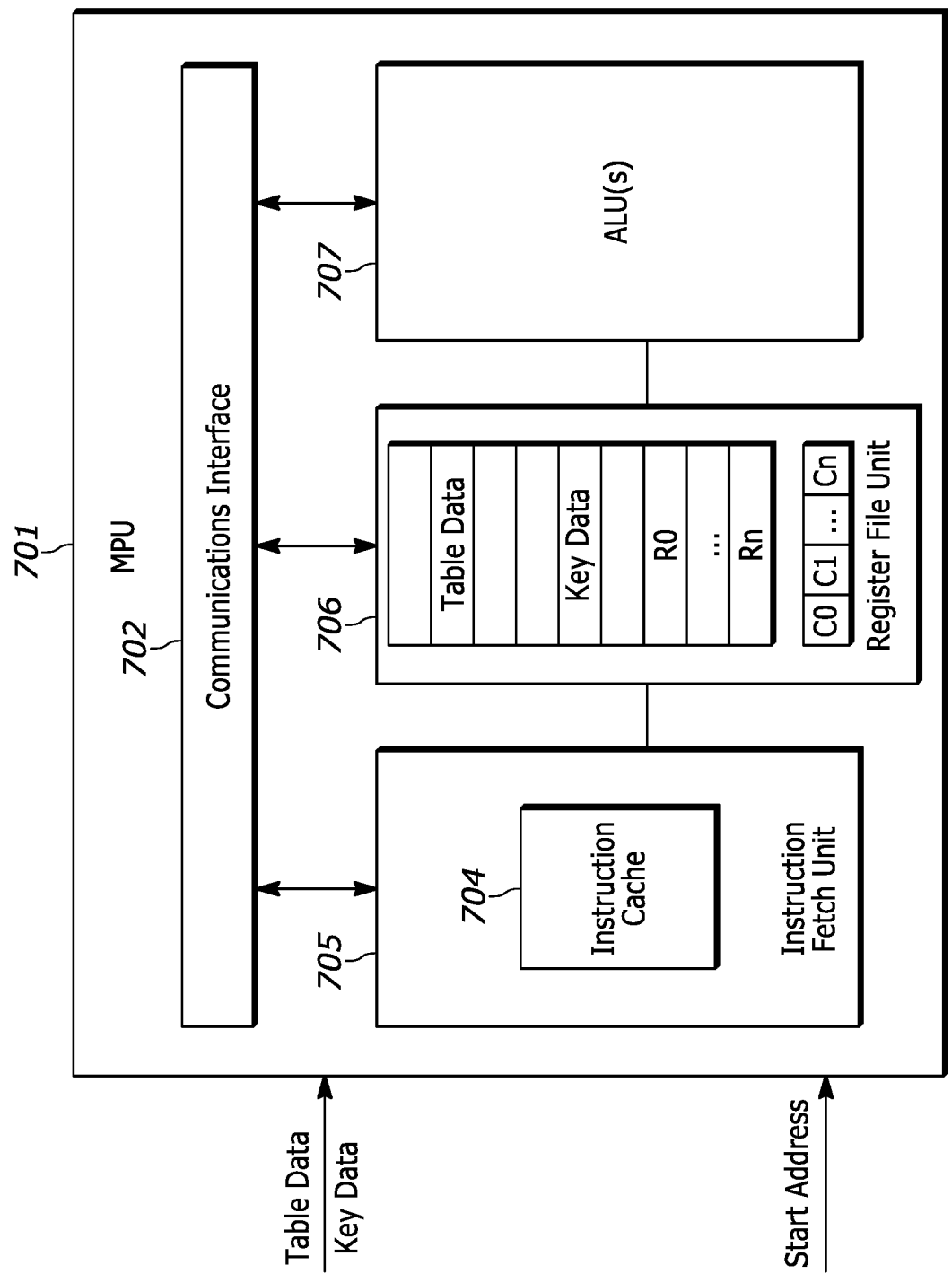
FIG. 7 illustrates a block diagram of a match processing unit (MPU) that may be used within an exemplary system to implement some aspects.

FIG. 7 illustrates a block diagram of a match processing unit (MPU) 701 that may be used within an exemplary system to implement some aspects. The MPU 701 can have multiple functional units, memories, and a register file. For example, the MPU 701 may have an instruction fetch unit 705, a register file unit 706, a communication interface 702, arithmetic logic units (ALUs) 707 and various other functional units.

In the illustrated example, the MPU 701 can have a write port or communication interface 702 allowing for memory read/write operations. For instance, the communication interface 702 may support packets written to or read from an external memory (e.g., high bandwidth memory (HBM) of a host device) or an internal static random-access memory (SRAM). The communication interface 702 may employ any suitable protocol such as Advanced Microcontroller Bus Architecture (AMBA) Advanced extensible Interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 702 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 701 can have an instruction fetch unit 705 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 705 can have an instruction cache 704 for storing one or more programs. In some cases, the one or more programs may be loaded into the instruction cache 704 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 702. This provides flexibility to allow for executing different programs associated with different types of data using the same processing unit. In an example, a management packet header vector (PHV) can be injected into the pipeline, for example, to perform administrative table direct memory access (DMA) operations or entry aging functions (i.e., adding timestamps), one of the management MPU programs may be loaded to the instruction cache to execute the management function. The instruction cache 704 can be implemented using various types of memories such as one or more SRAMs.

The one or more programs can be any programs such as P4 programs related to reading table data, building headers, DMA to/from memory regions in HBM or in the host device and various other actions. The one or more programs can be executed in any stage of a pipeline as described elsewhere herein.

The MPU 701 can have a register file unit 706 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 706 may comprise a plurality of general-purpose registers (e.g., R0, R1, . . . Rn) which may be initially loaded with metadata values then later used to store temporary variables within execution of a program until completion of the program. For example, the register file unit 706 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 706 can have a comparator flags unit (e.g., C0, C1, ... Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g. 8 one-bit comparator flags). In practice, an MPU can have any number of comparator flag units each of which may have any suitable length.

The MPU 701 can have one or more functional units such as the ALU(s) 707. An ALU may support arithmetic and logical operations on the values stored in the register file unit 706. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g. table flush), or perform operations that are not related to PHV update. For example, an ALU may be configured to perform calculations on descriptor rings, scatter gather lists (SGLs), and control data structures loaded into the general purpose registers from the host memory.

The MPU 701 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

In some embodiments, a single MPU may be configured to execute instructions of a program until completion of the program. In other embodiments, multiple MPUs may be configured to execute a program. As described in more detail below, a table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 700 MHz in which scenario multiple MPUs may be desirable.

Figure 8:
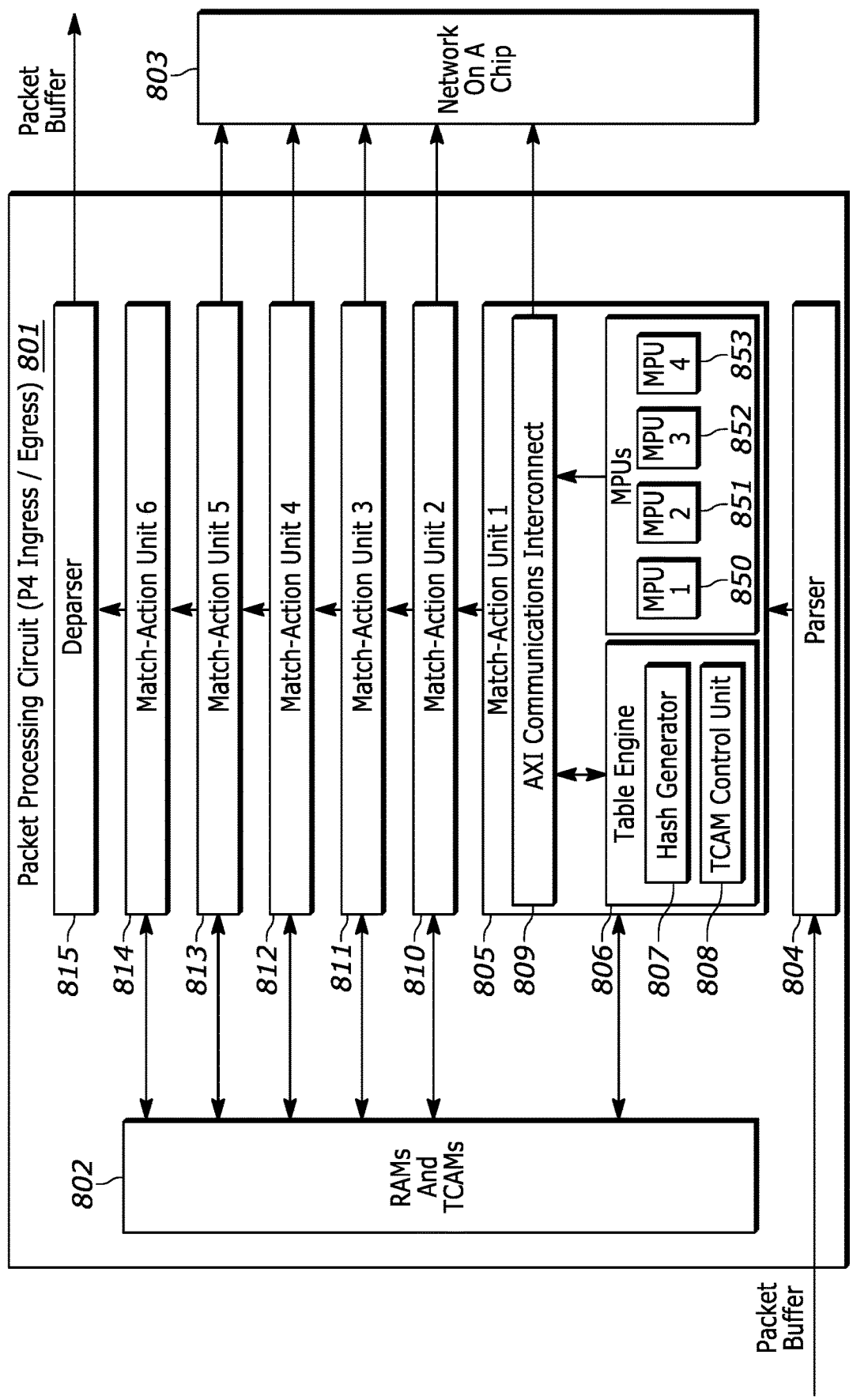
FIG. 8 illustrates a block diagram of a packet processing circuit that may be used as a P4 ingress/egress pipeline within an exemplary system.

FIG. 8 illustrates a block diagram of a packet processing circuit 801 that may be configured as a P4 ingress/egress pipeline within an exemplary system. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 804) according to the packet header stack specified by a P4 program. This parsed representation of the packet may be referred to as a packet header vector (PHV). The PHV may then be passed through stages (e.g., stages 805, 810, 811, 812, 813, 814) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 815. The deparser 815 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress parsed header vector. The egress parsed header vector may be passed through a P4 egress pipeline in a similar fashion as a packet passing through a P4 ingress pipeline, after which a final deparser operation may be executed before the packet is sent to its destination interface or recirculated for additional processing. The NIC 601 of FIG. 6 has a P4 ingress pipeline and a P4 egress pipeline. The P4 ingress pipeline and the P4 egress pipeline can be implemented via a packet processing circuit 801.

In some embodiments, the P4 ingress pipeline and the P4 egress pipeline may be implemented using the same physical block or processing unit pipeline.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV.

The PHV produced by the parser may have any size or length. For example, the PHV can be a least 512 bits, 256 bits, 128 bits, 64 bits, 32 bits, 8 bits or 4 bits. A long PHV (e.g., a 6 Kb PHV containing all relevant header fields and metadata) can be time division multiplexed (TDM) across several cycles. The TDM capability provides support for variable length PHVs, including very long PHVs to enable complex features. A PHV length may vary as the packet passes through the pipeline stages.

The pipeline MPUs of the match-action units 805, 810, 811, 812, 813, 814 can be same as the MPU 701 of FIG. 7. Match-action units can have any number of MPUs. The match-action units of a match-action pipeline can all be identical. In an embodiment, each match-action unit includes four MPUs (MPU 1 850, MPU 2 851, MPU 3 852, and MPU 4 853) that are configured to process instructions in parallel during the stage that is associated with the match-action unit.

A table engine 806 may be configured to support per-stage table match. For example, the table engine 806 may be configured to hash, lookup, and/or compare keys to table entries. The table engine 806 may be configured to control the address and size of the table, use PHV fields to generate a lookup key, and find Session Ids or MPU instruction pointers that define the P4 program associated with a table entry. A table result produced by the table engine can be distributed to the multiple MPUs in the stage.

The table engine 806 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (1Pv4), Internet Protocol version 6 (1Pv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

In some embodiments, the table engine 806 can have a hash generation unit 807. The hash generation unit may be configured to generate a hash result from a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset can be added to create a memory index. The memory index may be sent to the DRAM or SRAM array and to perform the read.

The table engine 806 can have a TCAM control unit 808. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 806 may be implemented by hardware or circuitry. The table engine may be hardware defined. In some cases, the results of table lookups or table results are provided to the MPU in its register file.

A match-action pipeline can have multiple match-action units such as the six units illustrated in the example of FIG. 8. In practice, a match-action pipeline can have any number of match-action units. The match-action units can share a common set of SRAMs and TCAMs 802. The SRAMs and TCAMs 802 may be components of the pipeline. This arrangement may allow the six match-action units to divide match table resources in any suitable proportion which provides convenience to the compiler and eases the complier's task of resource mapping. Any suitable number of SRAM resources and any suitable number of TCAM resources may be used by each pipeline. For example, the illustrated pipeline can be coupled to ten SRAM resources and four or eight TCAM resources. In some instances, TCAMs may be fused vertically or horizontally for a wider or deeper search.

With regard to FIG. 8, each match-action unit (805, 810, 811, 812, 813, 814) includes match processing units that can process actions from a table engine in parallel during the corresponding stage. For example, each match-action unit may include two, three, four, ten, or twelve match processing units (MPUs). In the example shown in FIG. 8, each match-action unit includes four MPUs (MPU 1 850, MPU 2 851, MPU 3 852, MPU 4 853).

In a multistage processing pipeline as shown in FIG. 8, all processing of a predicate in a particular stage (e.g., a particular match-action unit) must be completed before the processing can proceed to the next stage in the multistage processing pipeline. Thus, the length of time required to complete the stage is a function of the number of cycles required to execute all of the instructions associated with the stage. In a match-action unit, the number of instructions is dictated by an action, or actions, corresponding to a table. For example, when the table includes a single action, the length of time required to complete all of the processing in the stage is dictated by the number of instructions corresponding to the single action. Likewise, when the table includes multiple actions, the actions are typically distributed amongst the MPUs in a stage. Although actions can be distributed amongst the MPUs in a stage, the length of time required to complete all of the processing in the stage is dictated by the action that needs the most cycles to complete, e.g., the action with the most instructions. For example, if the set of actions has three actions of 8, 10, and 23 instructions, respectively, then the length of time required to complete all of the processing in the stage is dictated by the action with 23 instructions.

In some cases, a single action corresponding to a table may include subsets of instructions that can be executed independent of each other. For example, a subset of instructions corresponding to the action that is written to set a variable may be able to be executed independent of another subset of instructions corresponding to the action that is written to perform a lookup or a mathematical operation. It has been realized that if an action has subsets of instructions that can be executed independent of each other, then there may be an opportunity to assign the subsets of instructions to different processing units (e.g., different MPUs) in the stage of the multistage processing pipeline to reduce the length of time that is required to complete the processing in the particular stage. In accordance with an embodiment of the invention, operating a multistage programmable processing pipeline involves compiling a set of instructions for a stage of a multistage programmable processing pipeline in which the stage of the multistage programmable processing pipeline includes multiple processing units configured to processes instructions in parallel, wherein compiling the set of instructions includes identifying first and second subsets of instructions within the set of instructions that can be executed independent of each other, assigning the first subset of instructions to a first processing unit of the stage, assigning the second subset of instructions to a second processing unit of the stage, and executing the first and second subsets of instructions in parallel at the first and second processing units, respectively. In an embodiment, the first subset of instructions is assigned to the first processing unit and the second subset of instructions is assigned to the second processing unit to reduce the length of the longest thread of instructions that must be processed in the stage. Reducing the length of time that is required to complete the processing of even one stage in a multistage processing pipeline can improve the performance of the multistage processing pipeline. Improvements in performance of a multistage processing pipeline can be further enhanced when reductions in the per-stage processing time are achieved over multiple stages in a multistage processing pipeline.

An example of a technique for distributing instruction execution amongst multiple MPUs in a stage of a multistage programmable packet processing pipeline of match-action units is described with reference to FIGS. 9-13B.

FIG. 9 illustrates an example of actions, associated with a table, that are to be executed in a match-action unit of a multistage processing pipeline in which the stages include multiple MPUs, e.g., four MPUs, that can execute instructions in parallel. In the example of FIG. 9, there are three actions associated with the table and each action has a definite number of instructions, e.g., Action 1 has 8 instructions, Action 2 has 10 instructions, and Action 3 has 23 instructions. Additionally, in the example of FIG. 9, the instructions of Action 3 include three subsets of instructions, e.g., common_block (6 instructions), block_X (8 instructions), and block_Y (9 instructions). Given the actions as shown in FIG. 9, the length of time required to process all of the instructions of the stage is dictated by the length of time required to process the instructions of Action 3.

FIG. 10 illustrates an example of conventional processing of the instructions corresponding to Action 1, Action 2, and Action 3 by three MPUs in a match-action unit 1005 of a multistage processing pipeline. In the example of FIG. 10, the 8 instructions of Action 1 are processed serially by MPU 1 1050, the 10 instructions of Action 2 are processed serially by MPU 2 1051, and the 23 instructions of Action 3 are processed serially by MPU 3 1052. MPU 4 1053 is not assigned to process any of the actions during this stage of the pipeline processing. Additionally, the three actions are processed in parallel (e.g., at least some of the instructions are processed simultaneously) by the three MPUs and the pipeline processing of the corresponding data (e.g., data associated with a particular packet) cannot proceed to the next stage in the pipeline until all of the instructions of the actions have been executed. Given that MPU 3 must serially process 23 instructions while MPUs 1 and 2 need only process 8 and 10 instructions, respectively, part of the processing time required by this stage involves processing by only MPU 3, leaving MPUs 1, 2, and 4 sitting idle for at least some of the time during the stage.

As stated above, it has been realized that if an action includes subsets of instructions that can be executed independent of each other, then there may be an opportunity to reduce the length of time required to process all the instructions in a stage of a multistage processing pipeline. For example purposes, it is assumed that Action 3 includes two subsets of instructions that can be executed independent of each other. FIG. 11 illustrates two subsets of the instructions of Action 3 that can be executed independent of each other. In particular, a first subset of instructions includes common_block (6 instructions) and block_X (8 instructions) and a second subset of instructions includes common_block (6 instructions) and block_Y (9 instructions).

In an embodiment, a compiler of the match-action unit is able to identify subsets of instructions that can be executed independent of each other. For example, the compiler may implement parallelization (also referred to as auto parallelization) to convert sequential code/instructions into multithreaded so that the code/instructions can be executed by multiple processors in parallel, e.g., simultaneously. In an embodiment, a compiler is configured to detect independent threads (or blocks of code/instructions) in the same action using, for example, control flow analysis and data dependency analysis.

Figures 12, 13A, 13B:
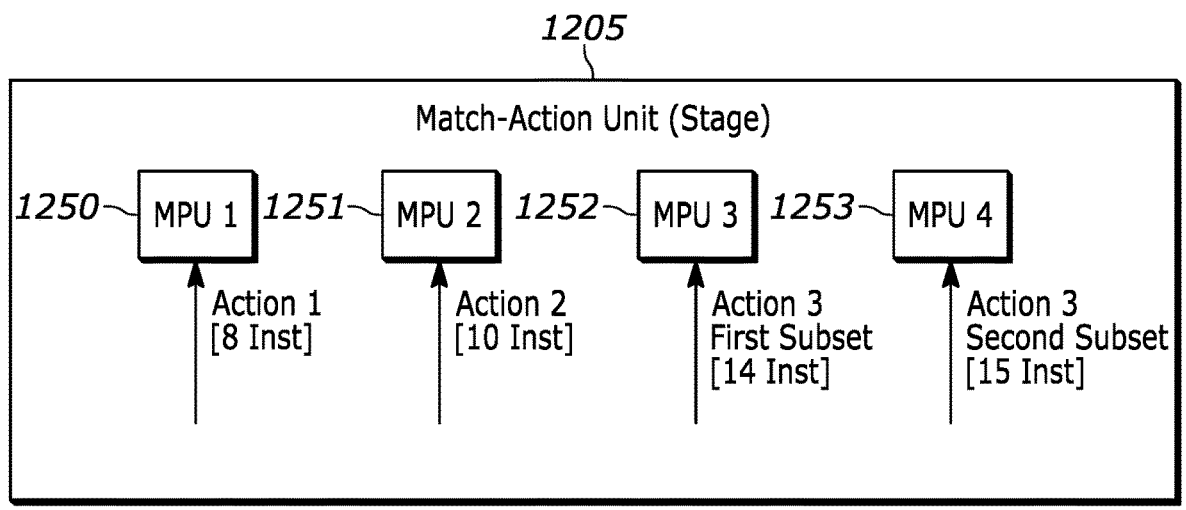
FIG. 12 illustrates the processing of the instructions corresponding to Action 1, Action 2, and Action 3 in which independently executable subsets of instructions for an action have been distributed amongst available MPUs.
FIGS. 13A and 13B are tables that show the number of instructions per MPU and the maximum number of instructions that must be serially processed by an MPU in the stage.

Once independently executable subsets of instructions for an action have been identified, it can be determined if it is possible to distribute the subsets of instructions amongst the MPUs of a stage in a manner that can better balance the number of instructions assigned to each MPU to reduce the length of time required to execute all of the instructions corresponding to the stage. For example, in the scenario described with reference to FIGS. 9-11, it is possible to reduce the length of time required to execute all of the instructions corresponding to this stage by assigning the first subset of instructions to one of the available MPUs (e.g., MPU 3) in the stage and the second subset of instructions to another available MPU (e.g., MPU 4) in the stage. FIG. 12 illustrates the processing of the instructions corresponding to Action 1, Action 2, and Action 3 in which independently executable subsets of instructions for an action have been distributed amongst available MPUs in a match-action unit 1205. As illustrated in FIG. 12, the 8 instructions of Action 1 are processed serially by MPU 1 1250, the 10 instructions of Action 2 are processed serially by MPU 2 1251, and the 23 instructions of Action 3 are processed by a combination of MPU 3 1252 and MPU 4 1253. In particular, the first subset of instructions (14 instructions) of Action 3 is processed by MPU 3 and the second subset of instructions (15 instructions) of Action 3 is processed by MPU 4 and because the subsets of instructions have been assigned to different MPUs in the stage of the multistage processing pipeline, the longest thread of instructions in the stage has been reduced from 23 instructions (as illustrated in FIG. 10) to 15 instructions (as illustrated in FIG. 12).

FIGS. 13A and 13B are tables that show the number of instructions per MPU and the maximum number of instructions that must be serially processed by any one MPU in the stage under the scenarios illustrated in FIGS. 10 and 12, respectively. As shown in FIG. 13A, MPU 1 executes 8 instructions, MPU 2 executes 10 instructions, MPU 3 executes 23 instructions, and MPU 4 has no instructions to execute, such that the maximum number of instructions that must be executed by any one MPU to complete the stage is 23. In contrast to FIG. 13A, as shown in FIG. 13B, MPU 1 executes 8 instructions, MPU 2 execute 10 instructions, MPU 3 executes 14 instructions, and MPU 4 executes 15 instructions, such that the maximum number of instructions that must be executed by any one MPU to complete the stage is 15. Thus, by distributing independently executable subsets of instructions for an action amongst MPUs in a manner that better balances the number of instructions assigned to each MPU, the maximum number is instructions that must be executed by any one MPU in a stage to complete the stage is reduced from 23 instructions to 15 instructions, which can reduce idle time of a stage and improve performance of a programmable processing pipeline.

In another embodiment, a determination of MPU availability may be made before actions are evaluated for independently executable subsets of instructions. If there are no available MPUs, then an evaluation of the actions may be skipped.

Various algorithms may be employed to distribute subsets of independently executable instructions amongst available MPUs to reduce the length of time needed to complete a stage. Some algorithms may be designed to find the distribution of subsets that results in the minimum length of time, while other algorithms may be designed to reduce the length of time (relative to an execution approach as described with reference to FIGS. 10 and 13A) while placing a value on some other parameter, or parameters.

In an embodiment, there may be multiple actions with subsets of independently executable instructions. In such a case, a distribution algorithm may evaluate different distributions scenarios amongst the different actions and the number of available MPUs. In some embodiments, there may be more than two MPUs that are available to receive a subset of instructions. In general, if there are N available MPUs (where N is an integer of 2 or more) and if there are M independently executable subsets of instructions, the M subsets can be distributed amongst the N MPUs in a manner that reduces the length of processing time required to complete the stage relative to the case in which each action is processed by only a single action-specific MPU. Additionally, some algorithms may be designed to find the distribution of subsets that results in the minimum length of processing time, while other algorithms may be designed to reduce the length of processing time while placing a value on some other parameter, or parameters, e.g., prioritizing an action for a specific MPU.

In some embodiments, an independently executable subset of instructions can be assigned to an MPU that already has an assigned action, for example, when the action assigned to the MPU is short enough that the additional subset of instructions still provides a performance advantage to the stage. For example, if MPU 1 has been assigned an action with a relatively small number of instructions, it may be possible to reduce the length of processing time required to complete the stage (relative to the case in which an action is processed by a single MPU) by assigning a subset instructions from another action to MPU 1.

Figure 14:
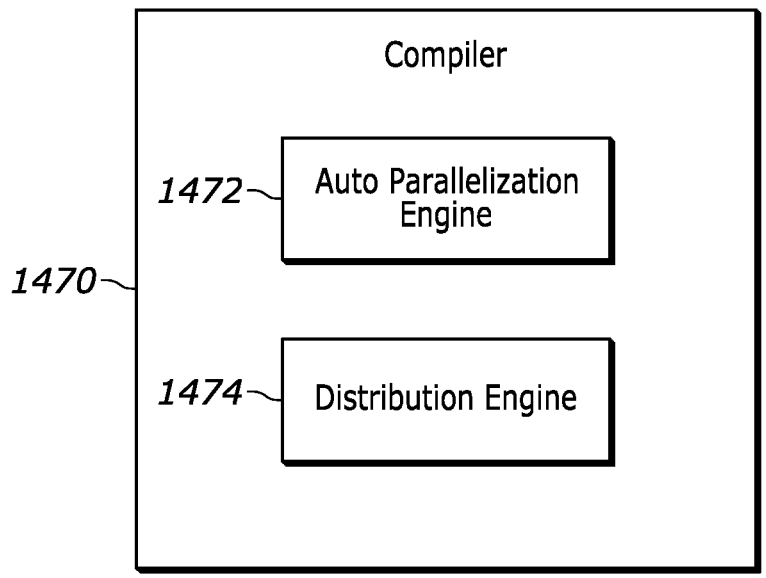
FIG. 14 is an example of a compiler that includes an auto parallelization engine and a distribution engine.

FIG. 14 is an example of a compiler 1470 that includes an auto parallelization engine 1472 and a distribution engine 1474. In an embodiment, the auto parallelization engine is configured to identify independently executable subsets of instructions in actions that are used in match-action units. For example, the auto parallelization engine is configured to identify independently executable subsets of instructions as described above. In an embodiment, the distribution engine is configured to assigned actions and subsets of instructions for actions to particular MPUs of a stage of a programmable processing pipeline, such as a match-action pipeline as described above with reference to FIG. 8. The compiler may be implemented on a computing system as is known in the field.

Figure 15:
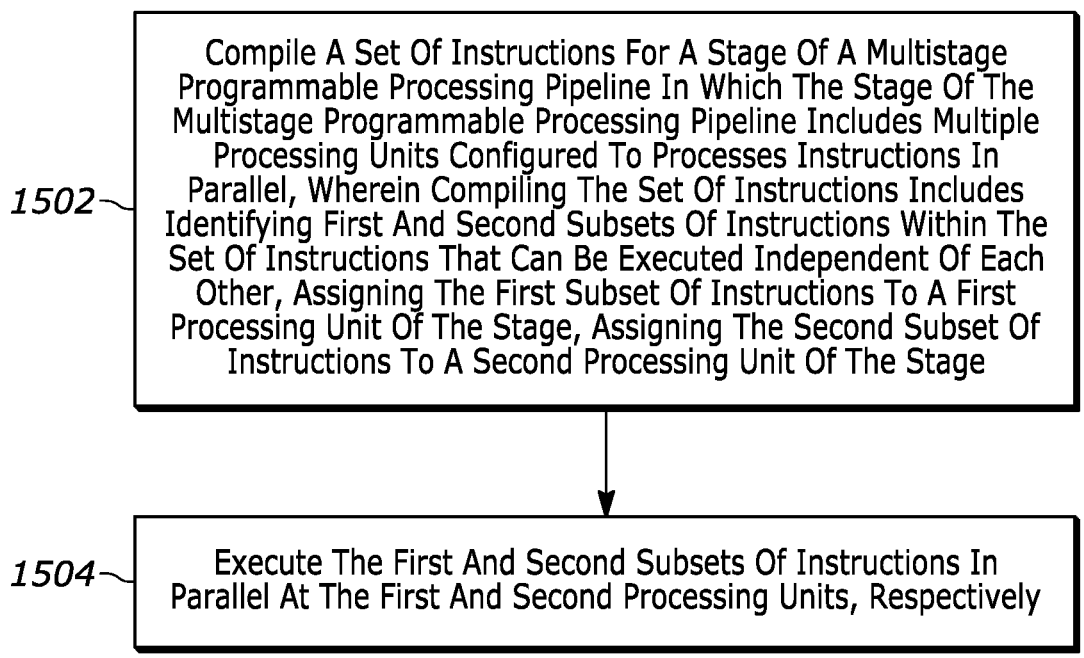
FIG. 15 is a process flow diagram of a technique for operating a multistage programmable processing pipeline. Throughout the description, similar reference numbers may be used to identify similar elements.

FIG. 15 is a process flow diagram of a technique for operating a multistage programmable processing pipeline. The process includes, at block 1502, compiling a set of instructions for a stage of a multistage programmable processing pipeline in which the stage of the multistage programmable processing pipeline includes multiple processing units configured to processes instructions in parallel, wherein compiling the set of instructions includes, identifying first and second subsets of instructions within the set of instructions that can be executed independent of each other, assigning the first subset of instructions to a first processing unit of the stage, and assigning the second subset of instructions to a second processing unit of the stage. At block 1504, the process includes executing the first and second subsets of instructions in parallel at the first and second processing units, respectively. In an embodiment, the process is implemented via a compiler and a network appliance as described herein.

Although the technique is described with reference to a pipeline of match-action units that include multiple MPUs configured to process instructions in parallel, the technique is applicable to other multistage programmable processing pipelines that include parallel processing units in at least one stage of the pipeline. For example, the parallel processing units may be parallel CPUs, parallel CPU cores, parallel ARM processors, parallel ARM cores, etc.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniBand interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a multistage programmable processing pipeline circuit, the method comprising:
    compiling a set of instructions for a stage of the multistage programmable packet processing pipeline circuit that is executed in response to receiving a packet header vector (PHV) corresponding to a packet, wherein the stage of the multistage programmable packet processing pipeline circuit includes a match-action unit with multiple match processing units (MPUs) configured to process instructions in parallel and wherein the processing of all instructions in the set of instructions is completed before processing of the packet proceeds to the next stage in the multistage programmable packet processing pipeline circuit, wherein compiling the set of instructions includes:
        identifying first and second subsets of instructions within the set of instructions that are able to be executed independent of each other, wherein the set of instructions corresponds to an action that is identified by a lookup in the match-action unit using PHV;
        assigning the first subset of instructions to a first MPU in the match-action unit of the stage;
        assigning the second subset of instructions to a second MPU in the match-action unit of the stage; and
        wherein the first and second subsets of instructions are to be executed in parallel at the first and second MPU of the match-action unit, respectively.

2. The method of claim 1, wherein the first subset of instructions is assigned to the first MPU and the second subset of instructions is assigned to the second MPU to reduce a length of a longest thread of instructions that must be processed by the match-action unit in the stage of the multistage programmable packet processing pipeline circuit.

3. The method of claim 1, wherein the first subset of instructions is assigned to the first MPU and the second subset of instructions is assigned to the second MPU to reduce idle time associated with processing the set of instructions in the stage of the multistage programmable packet processing pipeline circuit.

4. The method of claim 1, wherein the first subset of instructions is assigned to the first MPU and the second subset of instructions is assigned to the second MPU to balance the number of instructions that are executed by the first and second MPUs of the match-action unit.

5. The method of claim 1, wherein the set of instructions is provided to the stage as a table of actions.

6. The method of claim 1, wherein identifying that the first and second subsets of instructions are able to be executed independent of each other comprises implementing an auto parallelization engine.

7. The method of claim 1, wherein at least one of the first and second MPUs is an available MPU.

8. A system comprising:
    a multistage programmable packet processing pipeline circuit in which stages of the multistage programmable packet processing pipeline circuit include a match-action unit with multiple match processing units (MPUs), configured to process instructions in parallel and wherein the processing of all instructions for a particular stage in the multistate programmable packet processing pipeline circuit is completed before processing of a packet proceeds to a next stage in the multistage programmable packet processing pipeline circuit; and
    a memory that stores a set of instructions that corresponds to and action that is identified by a lookup in the match-action unit in response to receiving a packet header vector (PHV), which corresponds to a packet received at the multistage programmable packet processing pipeline circuit, wherein the set of instructions includes:
        first and second subsets of instructions that are able to be executed independent of each other, wherein the set of instructions is to be executed by match-action unit within the stage of the multistage programmable packet processing pipeline circuit by
        executing the first subset of instructions at a first MPU in the match-action unit of the stage and
        executing the second subset of instructions at a second MPU in the match-action unit of the stage.

9. The system of claim 8, wherein the first subset of instructions is assigned to the first MPU and the second subset of instructions is assigned to the second MPU to balance the number of instructions that are to be executed at the first and second MPU.

10. The system of claim 8, wherein the set of instructions is provided to the stage as a table of actions.

11. The system of claim 8, wherein the first subset of instructions is assigned to the first MPU and the second subset of instructions is assigned to the second MPU to reduce a length of a longest thread of instructions that must be processed by the match-action unit in the stage of the multistage programmable packet processing pipeline circuit.

12. The system of claim 8, wherein the first subset of instructions is assigned to the first MPU and the second subset of instructions is assigned to the second MPU to reduce idle time associated with processing the set of instructions in the stage of the multistage programmable packet processing pipeline circuit.

13. A system comprising:
a multistage programmable packet processing pipeline circuit in which stages of the multistage programmable packet processing pipeline circuit include a match-action unit with multiple match processing units (MPUs) configured to process instructions in parallel and wherein the processing of all instructions for a particular stage in the multistage programmable packet processing pipeline circuit is completed before processing of a packet proceeds to a next stage in the multistage programmable packet processing pipeline circuit; and
a memory that stores a set of instructions of an action that is identified by a lookup in the match-action unit in response to receiving a packet header vector (PHV), the PHV corresponding to a packet received at the multistage programmable packet processing pipeline circuit, the set of instructions of the action including a first subset of instructions and a second subset of instructions that are able to be executed independent of each other, wherein the first subset of instructions is executed at a first MPU in the match-action unit of the stage in parallel with execution of the second subset of instructions at the second MPU in the match-action unit of the stage.

14. The system of claim 13, wherein the first subset of instructions is assigned to the first MPU and the second subset of instructions is assigned to the second MPU to reduce a length of a longest thread of instructions that must be processed by the match-action unit in the stage of the multistage programmable packet processing pipeline circuit.

15. The system of claim 13, wherein the first subset of instructions is assigned to the first MPU and the second subset of instructions is assigned to the second MPU to reduce idle time associated with processing the set of instructions in the stage of the multistage programmable packet processing pipeline circuit.

16. The system of claim 13, wherein the first subset of instructions is assigned to the first MPU and the second subset of instructions is assigned to the second MPU to balance the number of instructions that are executed at the first and second MPUs.

17. The system of claim 13, wherein the set of instructions is provided to the stage as a table of actions.

* * * * *